No. 751,973. Patented February 9, 1904.

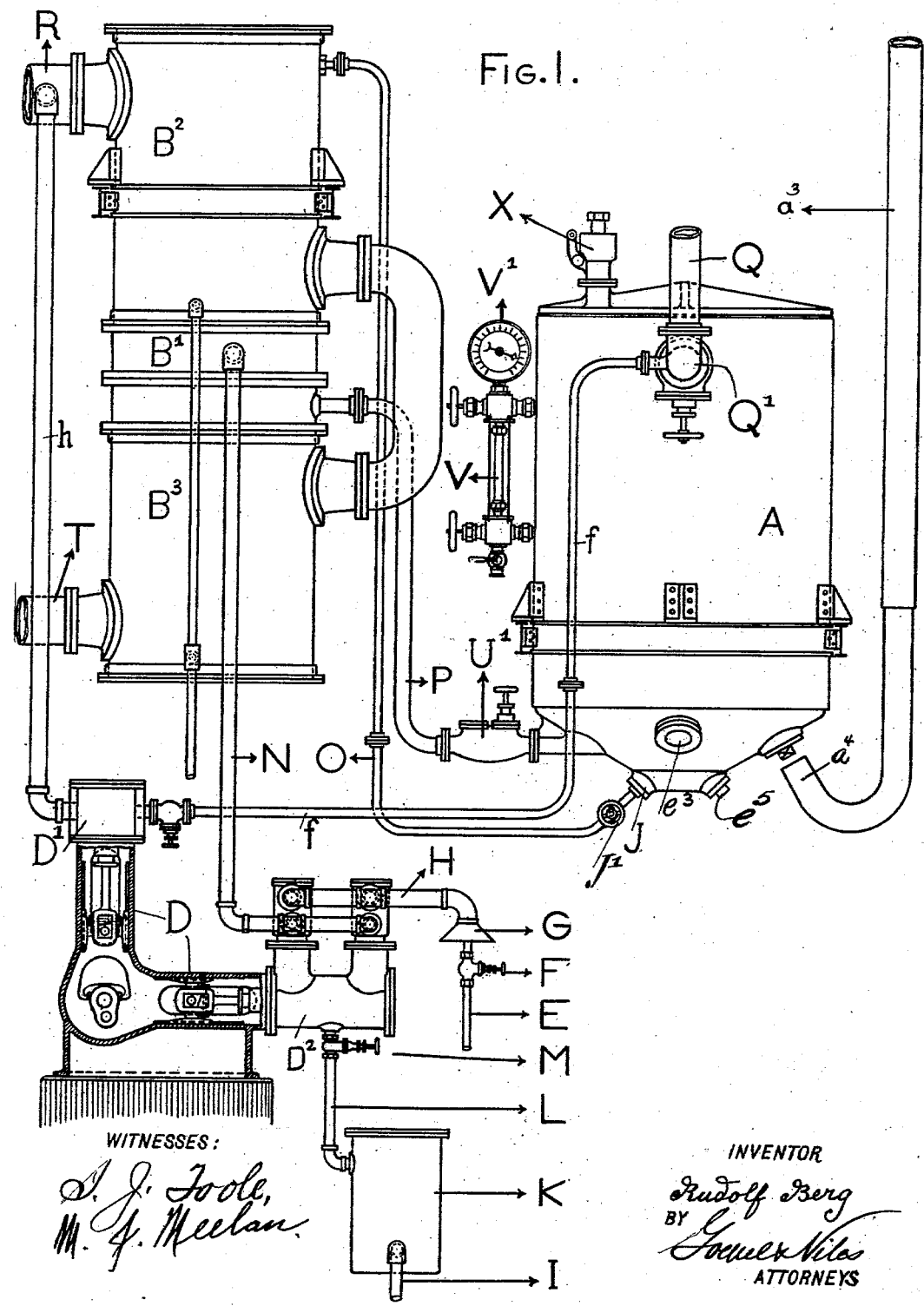

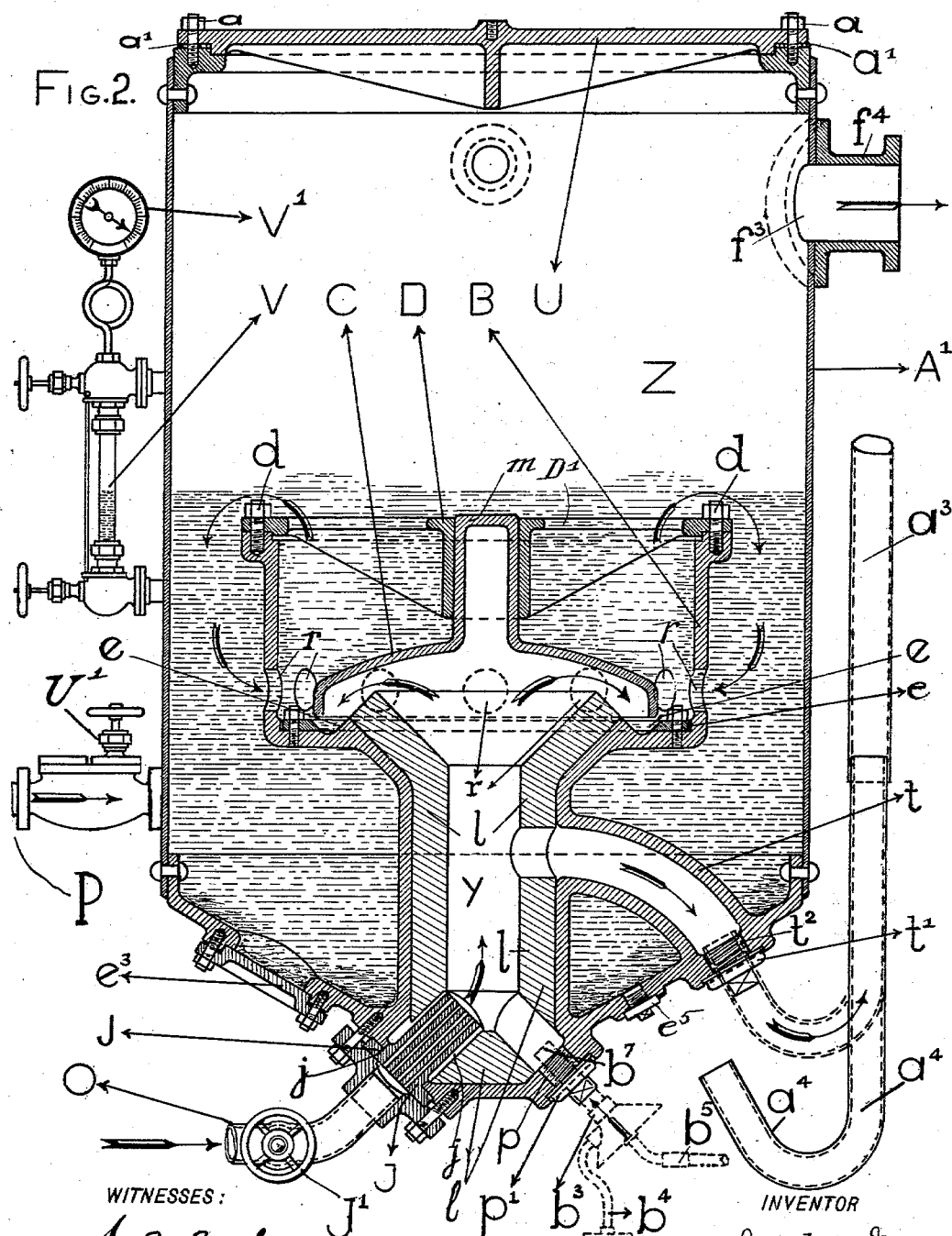

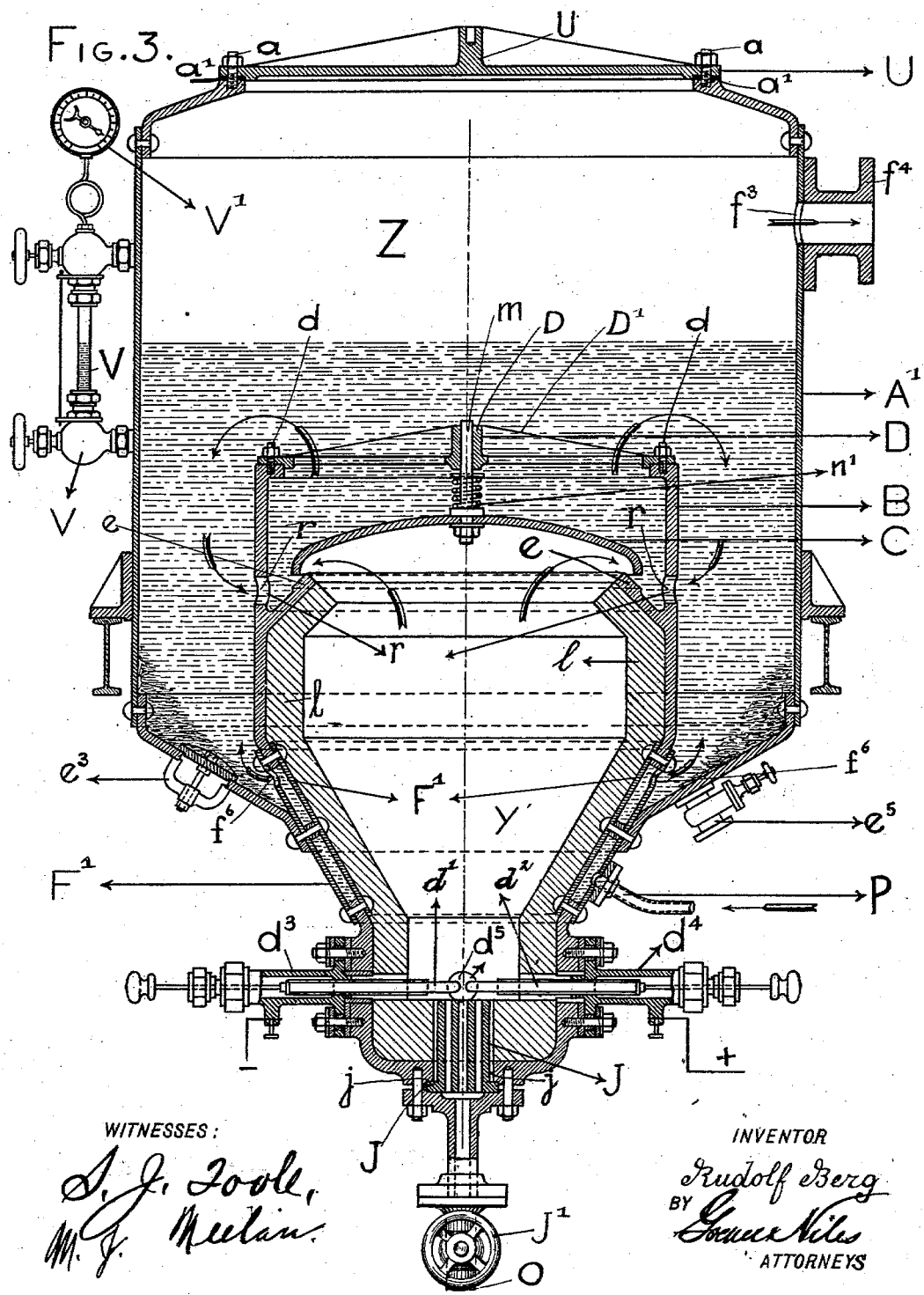

UNITED STATES PATENT OFFICE.

RUDOLF BERG, OF PITTSBURG, PENNSYLVANIA, ASSIGNOR OF ONE-HALF TO FERDINAND WENIG, OF PITTSBURG, PENNSYLVANIA.

MOTOR-FLUID GENERATOR.

SPECIFICATION forming part of Letters Patent No. 751,973, dated February 9, 1904.

Application filed March 16, 1903. Serial No. 148,007. (No model.)

*To all whom it may concern:*

Be it known that I, RUDOLF BERG, a citizen of the United States, residing in Pittsburg, in the county of Allegheny and State of Pennsylvania, have invented certain new and useful Improvements in Motor-Fluid Generators, of which the following is a specification.

It is a well-known fact that the energy obtained from fuel in the steam-boilers heretofore in use is a very small percentage of the theoretical energy contained in the same. In consequence thereof the trend of improvements in steam-boilers has been in the direction of fuel-saving devices, feed-water heaters, and other structures by which an economy in fuel was obtained. The nearest approach toward obtaining a greater amount of energy from the fuel was made in the well-known internally-fired boilers; but these boilers have so many practical disadvantages that they have met with little success. Another percentage of the lost heat of steam plants is due to the radiation from the furnace-walls and the incomplete combustion of the furnace-gases which are carried away through the smoke-stack. The foregoing losses and disadvantages are further increased by the formation of scale on the interior surface of the steam-boiler shells or water-tubes and the layer of ashes formed on the exterior surfaces, which require not only frequent cleaning and inspection, but form also one of the sources of erosion of the metal, and consequent explosion of steam-boilers. Furthermore, boilers as constructed heretofore have a great number of parts which are required to be kept water-tight, by which the cost of the same is increased and by which the cost of maintenance for keeping them at the highest degree of efficiency is also increased. Another objection to steam-boilers hitherto in use is that the efficient combustion of the fuel depends to a considerable extent upon the skill of the stokers, the lack of which may cause a waste of fuel without a corresponding generation of heat. The present systems of boilers require, furthermore, boilers of very large dimensions for large power plants owing to the large amount of unutilized heat passing up the smoke-stack. It is therefore apparent that if the sources of the losses were obviated the objections to steam-boilers would be greatly diminished. It is, further, well known that the greatest efficiency in the generation and conversion of water into steam would be obtained by allowing the heat generated from fuel to get into direct contact with the water to be heated, so as to be converted thereby into steam. This principle, together with a more complete combustion of the heating medium, would form the underlying principle for a better generation of motor fluid.

The object of this invention is to furnish a motor-fluid generator which is designed to overcome the defects of the steam-generators heretofore in use and which is constructed on the basic principles set forth; and for this purpose the invention consists of a motor-fluid generator which comprises a cylindrical boiler, a combustion-chamber for the gaseous fuel located in said boiler, a dome-shaped valve extending over the combustion-chamber resting on a circular valve-seat, said combustion-chamber and valve being submerged in the water in the boiler, a valve-chamber provided with side perforations extending along said dome-shaped valve, so as to produce by the upward ebullition of the steam formed at the circumference of the valve a continuous circulation of the water to be evaporated, a twyer connected with the lower end of the combustion-chamber for supplying the combustible gas and air mixture, and means for producing a preparatory heating of the combustion-chamber, so as to heat up the walls of the same for igniting the gas and air mixture; and the invention consists, further, of certain additional details of construction and combinations of parts, which will be fully described hereinafter and finally pointed out in the claims.

In the accompanying drawings, Figure 1 represents a side elevation, partly in section, showing a steam plant for generating motor fluid. Fig. 2 is a vertical central section through the generator, and Fig. 3 is also a central section of a somewhat modified construction of the same.

Similar letters of reference indicate corresponding parts.

Referring to the drawings, A represents my improved motor-fluid generator.

B' B² B³ represent a feed-water heater of any improved construction through which the feed-water and a combustible gas and air mixture are passed so as to be heated up by the exhaust-steam or other motor fluid which is admitted to the upper part of the feed-water heater through the pipe R, and D is a compressor, preferably of the type for which Letters Patent have been granted to me heretofore under date of December 24, 1901, No. 689,702. The steam-engine D' of the compressor D receives its live steam from the generator A through the pipe f, which is connected with the main Q, the exhaust-steam or motor fluid of the engine D' passing through the pipe h to the exhaust-pipe R of the feed-water heater B' B² B³. The compressor D takes up the water through the suction-pipe I, passes the same to a purifier K, and thence through a pipe L and valve M to the compressing-cylinder D² of the compressor.

E is the supply-pipe for the gas, which may be obtained from any suitable source and which is provided with a valve F for regulating the supply of gas to the compressor.

G is a gas and air mixer which is connected by the air and gas suction pipe H with the compressor D. The air and gas thus sucked in are mixed in the compressor with the feed-water and subjected to isothermal compression in the same, then forced through the pipe N into the feed-water heater. The feed-water is raised to a temperature of 90° centigrade or more in the feed-water heater and conducted from the same through the pipe P and valve U' to the lower part of the generator A, while the combustible gas and air mixture, also heated to a temperature of 90° centigrade or more, is drawn off from the upper part of the feed-water heater and conducted through the pipe O and enters by the twyer J into the combustion-chamber of the generator A.

The generator A is provided with the usual accessories of steam-boilers—namely, a water-gage V, a pressure-gage V', a manhole $e^3$, a safety-valve X, a discharge-valve $e^5$ in the bottom of the generator for drawing off the sediment from the bottom of the generator when cleaning the same, main Q for conducting the motor-fluid to the separate motors, and supply-gate valve Q', &c. The exhaust-steam from the heater passes to the atmosphere through the pipe T at the lower part of the feed-water heater.

The generator A (shown in detail in Figs. 2 and 3) consists of a cylindrical vessel or boiler A', which is closed at its upper part by a top U, which is tightly held in position by screw-bolts a and kept steam-tight by suitable packings a'. The bottom of the generator is made of conical shape and riveted or welded to the lower end of the cylindrical body of the generator A. A combustion-chamber Y is arranged in the generator and the bottom of the same preferably made integral with the bottom of the combustion-chamber, which is provided at its lower end with an opening j for the insertion of the flanged twyer J, said twyer being connected with the supply-pipe O for the gas and air mixture. The twyer is provided with a plurality of passages or channels, so as to deliver the gas and air mixture into the combustion-chamber without igniting the same in the supply-pipe, on account of the cold walls of the twyer keeping the gas mixture under the temperature of combustion. The combustion-chamber Y is provided with a fire-brick lining l over its entire surface and is closed at its upper end by a dome-shaped valve C, which fits tightly on a seat e, that is screwed on the circumferential upper portion of the combustion-chamber. The dome-shaped valve C is provided with a central stem or spindle m, that is guided in a center sleeve D, which is supported by a frame D', having radial arms, said frame being attached to the upper end of a cylindrical extension B of the wall of the combustion-chamber Y, forming the valve-chamber, as shown clearly in Figs. 2 and 3. The supporting-frame D' is attached by screws d to the upper circumference of the cylindrical extension or valve-chamber. B. The supporting-frame, with sleeve D and valve C, are easily removed for cleaning when the top U has been taken off. The level of the water in the generator A is maintained above the upper edge of the valve-chamber B, so as to keep all the parts of the combustion-chamber, dome-shaped valve, and the extension-chamber entirely submerged, the level of the water being indicated on the gage V. The valve-chamber B is provided with a number of circumferential openings r in its lower part, by which the circulation of the water around the wall of the valve-chamber is kept up. The dome-shaped valve C forms a water-tight joint with its seat e. By the heating of the lining-walls of the combustion-chamber by the heat produced by the burning of the combustible gas and air mixture in the same motor fluid is generated and the pressure in the generator is gradually increased. This counter-pressure of the motor fluid, weight of water resting on the valve C, and force of spring n' is overcome by the pressure of the ignited gas and air mixture in the combustion-chamber, so that the dome-shaped valve is slightly raised, and thereby the intensely hot products of combustion permitted to pass outwardly at the entire circumference of the valve and come into direct contact with the water, so that the temperature at the point of contact is raised sufficiently to convert the water into steam, which, passing upwardly with the products of combustion, fills up the space in the generator above the level of the water and forms a motor fluid, which is composed of a mixture of steam and the products of combustion. By the ebullition imparted to the water in the valve-chamber during the upward passage of the steam and products of combustion an upward motion is imparted to the water, which passes then over the circumference of the valve-chamber B and then passes again in downward direction and inwardly toward the circumference of the valve C through the openings $n'$ in the lower part of the valve-chamber, so that continuously a new supply of water is brought in contact with the upwardly-passing ignited products of combustion, and thus a continuous circulation and generation of motor fluid is produced. In this manner a large quantity of water is evaporated, and thereby not only an efficient circulation of the liquid in the generator produced, but also a high pressure in the upper part or steam-space of the generator attained. As new quantities of heated-up feed-water are supplied through the pipe P to the generator, so as to keep up the proper water-level of the same, and as a continuous supply of ignited combustible air and gas mixture is supplied to the combustion-chamber, the generation of fluid motor is kept up and the motor fluid at the required pressure collected in the upper part or dome of the generator. The hot products of combustion, intermingled with the steam in the upper part of the generator, serve to dry the steam, and cause thereby a drying of the steam, in fact, a superheating. The boiler A' is provided at its upper part with an opening $f^3$, to which is connected a flange $f^4$, which is connected to the main Q, provided with a gate-valve Q'. From here it may be distributed to the various motors to be operated.

In the modified form of generator (shown in Fig. 3) a conical double-walled space or jacket F', with openings $f^5$, is arranged around the lower part of the combustion-chamber, through which the feed-water is supplied before entering the generator. This annular jacket serves for heating up the already heated feed-water to a still higher temperature. This heated-up water follows then the course of the arrow (shown in Fig. 3) and is generated into motor fluid at the annular opening formed between the upper edge of the combustion-chamber and the annular edge of the dome-shaped valve in the same manner as before described. It will be seen that in this case the feed-water of high temperature comes in contact with the highly-heated products of combustion and affords thereby means for the rapid evaporation of the water. To insure an efficient operation, it is desirable to have the pressure difference between the combustion-chamber and steam-chamber a minimum.

The operation for the generator has been described, in which a combustible gas and air mixture has been used. Instead of this mixture, however, any suitable oil or other liquid fuel properly atomized may be used when forced under pressure into the combustion-chamber. Many advantages attending the use of atomized liquid fuel necessarily accompany a generator using the same.

By "combustible gas" is understood any suitable gas, either as produced by processes well known or found in a natural state or also the "waste gases" of the blast-furnaces.

The generator shown in Fig. 2 is provided with a preliminary heating device for the purpose of starting the generator, which consists of a branch pipe $t$, that passes from the combustion-chamber through the bottom of the generator and is connected with the lower curved end $a^4$ of a conduit-pipe $a^3$, which is inserted into the lower end of the curved pipe $t$ after a screw-plug $t'$, which is usually inserted into the same, has been removed. A second screw-plug $p'$ in the lower part of the combustion-chamber serves for inserting a heating-up burner $b^3$, by which a heating-flame is supplied to the interior of the combustion-chamber, so as to heat it up sufficiently to heat the lining $l$ to a high temperature and cause the conversion of the water into steam. The products of combustion of the preliminary heating are drawn off through the downwardly-curved pipe $t$ and conduit-pipe $a^4 a^3$ to the smoke-stack. As soon as the fire-brick lining of the combustion-chamber is heated up sufficiently—i. e., above the temperature of combustion of the mixture—the conduit-pipe and heating-burner are removed and the openings closed by the screw-plugs $t' p'$. The combustible gas and air mixture is then forced by pressure through the twyer into the combustion-chamber Y and ignited by the highly-heated lining of the same. The pressure of the ignited products of combustion in the combustion-chamber on the valve lift the same and starts thereby the regular generation of motor fluid.

In the generator shown in Fig. 3 the twyer is arranged at the lower central portion of the combustion-chamber, and an electric ignition device for the preliminary heating of the combustion-chamber is shown in place of the gas-heating device. When the arc is formed between the electrodes of the electric ignition device, which is observed through a sight-glass $d^5$ in the lower part of the combustion-chamber, the supply of a combustible gas and air mixture to the twyer J is started and after ignition of the same by the arc the electrodes are withdrawn in outward direction into the protecting-housings $d^3 d^4$, provided for the same. The generation of the motor fluid then takes place in the same manner as shown in Fig. 2 after the pressure in the combustion-chamber has increased sufficiently to raise the dome-shaped valve.

The operation of my improved motor-fluid generator is as follows: Water which has been preheated is supplied to the cylindrical boiler A′ to about the height shown in the drawings and the top U tightly screwed to the top of the boiler A′. Plug $p'$ and plug $t'$ are removed, pipe $a^4$ inserted in the opening $t^2$, the nozzle $b^7$ of the preheater $b^3$, which is supported by a stand $b^4$ and provided with a supply-pipe $b^5$, is inserted in the opening $p$, and the fire-brick lining of the combustion-chamber Y thereby intensely heated, the products of combustion of the preheater passing through the branch pipe $t$ and curved pipe $a^4$ to the smoke-stack. When this is accomplished, the nozzle $b^7$ and curved pipe $a^4$ are withdrawn and plugs $p'$ $t'$ inserted. The fire-brick lining being heated to a temperature above that of the combustion of the gases, gate-valve J′ is opened, permitting the compressed gas and air mixture to enter the combustion-chamber, where, impinging against the red-hot fire-brick lining, it is ignited and forced with the products of combustion in the upper end of the combustion-chamber Y against the valve C, so as to lift it from its seat, so that the heated gases are brought into direct contact with the water in the boiler A′, thereby evaporating it. The ignited combustible gas and air mixture passes upwardly with such power as to lift the dome-shaped valve C and at the same time prevent the fluid in the boiler from entering the combustion-chamber Y. The hot bubbles of the generated motor fluid—i. e., steam and products of combustion—pass upwardly with considerable rapidity to the surface of the liquid, causing thereby an upward circulation of the liquid, which again pass downwardly between the extension-chamber and sides of the boiler A′ and through the holes $r$ of the extension-chamber B, whereby it is again brought in intimate contact with the heated products of combustion of the combustion-chamber Y, by means of which quantities of the liquid are evaporated and pass to the surface of the liquid of the boiler. This insures an efficient circulation of the liquid in the boiler, which is an essential feature of efficient generators. New quantities of feed-water, previously heated, pass from pipe P to the interior of the vessel A to supply the amount of liquid evaporated. In the modified form shown in Fig. 3 the feed-water passes first through the jacketed chamber F′, which is arranged between the walls of the combustion-chamber and the exterior shell of the boiler A′, in which it is heated to a high temperature. It is seen by following the direction indicated by the arrows that the parts are so arranged that the hottest water in the vessel A comes in contact with the heated products of combustion, affording thereby good conditions for the rapid evaporation of the liquid. The generated motor fluid is stored in the upper part Z of the boiler A′ and passes through gate-valve Q′ and main Q to the motors. As long as the supply of the combustible gas and air mixture is continued and sufficient water is present an efficient evaporation of the same takes place, whereas when the supply of gas and air mixture is diminished the upwardly-streaming ignited gases and products of combustion decrease correspondingly, thus permitting the counter-pressure of the water to again force the valve down on its seat, thus preventing any liquid whatever from entering the interior of the combustion-chamber.

The ignition described may be substituted by an electrical ignition device, and when such is used the generator may be set in operation immediately on turning on the valve of the gas and air mixture supply-pipe and turning on the electrical power for operating the ignition device.

The generated motor fluid stored in the upper part of the vessel A consists, essentially, of steam, ($H_2O$,) nitrogen, (N,) and carbonic-acid gas, ($CO_2$,) which mixture has an extremely high power of expansion, which is due to the low specific heat of the same, and which consequently may be worked with the highest economy.

Providing means for the generation of a medium by direct contact of the liquid to be evaporated with the ignited fuel many disadvantages attendant the present means for motor-fluid generation must necessarily fall away. As such may be mentioned the maintenance of tight joints of the parts containing the liquid and exposed to the action of the ignited products of combustion, the multiplicity of parts with the attendant easy formation of slag, which afford the best means for the erosion of the parts where such slag is formed, and the useless waste of heating power. The improved means require no boiler-settings, with the wasteful radiation of heat, with the firing of the boiler, which is dependent on the good will and skill of the stokers and firemen, with the costly waste of valuable unburned products of combustion going up the flue and smoke-stack, with the economizers for retaining some of this wasted heat, with the necessarily large boilers to counterbalance these various losses, with the enormous expense of these large boilers and heat-retaining appurtenances, not alone in first cost, but in the cost of maintenance also, with the costly floor-space which these large boilers and their heat-retaining appurtenances require, with the large weight of water required and the attendant danger, with the difficulty of cleaning and inspection, with the aggregation of units which require steam and water tight connections and which are exposed to the loosening of the joints, with the failure of one unit completely putting the whole plant out of use, with poor water circulation, with the high and expensive smoke-stacks, and with the production of large quantities of smoke, injurious to the health of animal and vegetable life and detrimental to public property. In contrast to these many practical and inherent disadvantages and objections the improved motor-fluid generator herein described not alone does away with these many causes of dissatisfaction, but affords ground for commendation to engineers.

The absence of the many objections to the boilers now in use may be called the great advantage of my improved motor-fluid generator. Among the advantages may be mentioned comparatively low first cost and maintenance, simplicity, efficiency, rapid generation, safety, no corrosion or unequal expansion of parts on opening the fire-doors, no complication or multiplicity of parts, no costly appurtenances, no excessive loss of heat by conduction, convection, and radiation, no high and costly smoke-stacks to attain a natural draft, no dependence on the weather, no separate boiler-house, as there are no cinders, smoke, or dust, permitting thereby the placing of the generator in the same room with the engines and dynamos, no high and expensive smoke-stacks, and finally the highest heating effect and power of evaporation obtainable by the complete combustion of the fuel and the same being brought in actual contact with the liquid to be evaporated.

Having thus described my invention, I claim as new and desire to secure by Letters Patent—

1. A motor-fluid generator, consisting of a closed boiler, a combustion-chamber open at its upper end and located in the lower part or water-space of the same, means for supplying a combustible gas and air mixture under pressure to said combustion-chamber, and a valve for the open upper end of the combustion-chamber, both combustion-chamber and valve being submerged in the water of the boiler, substantially as set forth.

2. In a motor-fluid generator, the combination with a closed boiler, of a combustion-chamber open at its upper end, and a valve for said open upper end, substantially as set forth.

3. A motor-fluid generator, consisting of a closed boiler, a combustion-chamber open at its upper end and located in the lower part or water-space of the same, means for supplying a combustible gas and air mixture under pressure to said combustion-chamber, a valve for closing the open upper end of said combustion-chamber, and means for guiding the valve so as to be raised or lowered by the internal pressure of the products of combustion in the combustion-chamber, substantially as set forth.

4. A motor-fluid generator, consisting of a closed boiler, a combustion-chamber open at its upper end and located in the lower part or water-space of the same, means for supplying a combustible gas and air mixture under pressure to said combustion-chamber, a valve for closing the open upper end of said combustion-chamber, a valve-seat for said valve at the circumference of the combustion-chamber, and means for guiding the valve so as to be raised or lowered by the internal pressure of the products of combustion in the combustion-chamber, substantially as set forth.

5. A motor-fluid generator, consisting of a closed boiler, a combustion-chamber open at its upper end in the lower part or water-space of said boiler, means for supplying a combustible gas and air mixture under pressure to said combustion-chamber, means for igniting the mixture in said combustion-chamber, a dome-shaped valve extending over the open upper end of the combustion-chamber, and means for guiding said valve in response to the internal pressure of the gases in the combustion-chamber when producing a direct contact of the hot products of combustion with the water at the circumference of the valve, substantially as set forth.

6. A motor-fluid generator, consisting of a closed boiler, a combustion-chamber located at the lower part or water-space of the boiler, a water-jacket at the lower part of said combustion-chamber with openings in its upper part, means for supplying water to said water-jacket, means for supplying a combustible gas and air mixture under pressure to the interior of the combustion-chamber, means for igniting said mixture, and a valve in the upper part of the combustion-chamber, substantially as set forth.

7. A motor-fluid generator, consisting of a closed boiler, a combustion-chamber located in the lower part or water-space of the same, a twyer in the bottom of the combustion-chamber provided with a plurality of passages, means for supplying a combustible gas and air mixture to said twyer and combustion-chamber, and a valve for opening or closing the combustion-chamber by the variation of the internal pressure of the gases in the combustion-chamber, substantially as set forth.

8. A motor-fluid generator, consisting of a closed boiler, a combustion-chamber in the lower part or water-space of the same, a twyer in the bottom of the combustion-chamber provided with a plurality of passages, means for supplying a combustible gas and air mixture to said twyer and combustion-chamber, an ignition device at the lower part of the combustion-chamber in proximity to the entrance of the gas and air mixture passing through the twyer, and a valve for the combustion-chamber, substantially as set forth.

9. A motor-fluid generator, consisting of a closed boiler, a combustion-chamber located in the lower part or water-space of the same and open at its upper end, means for supplying a combustible gas and air mixture under pressure to said combustion-chamber, an annular flange at the upper part of the combustion-chamber provided with a valve-seat, and a dome-shaped valve for the open upper end of the combustion-chamber and resting on the valve-seat when closed, substantially as set forth.

10. A motor-fluid generator, consisting of a closed boiler, a combustion-chamber located in the lower part or water-space of the same, means for supplying a combustible gas and air mixture under pressure to the bottom of the combustion-chamber, means for igniting said combustible gas and air mixture in the combustion-chamber, and a valve for the combustion-chamber actuated by the varying internal pressure of the gases in the combustion-chamber, substantially as set forth.

11. A motor-fluid generator, consisting of a closed boiler, a combustion-chamber in the lower part or water-space of the same, means for supplying a combustible gas and air mixture under pressure to said combustion-chamber, a valve for the upper part of the combustion-chamber, and means for causing the circulation of the water in the water-space of the boiler, substantially as set forth.

12. A motor-fluid generator, consisting of a closed boiler, a combustion-chamber in the lower part or water-space of the same, means for supplying a combustible gas and air mixture under pressure to said combustion-chamber, a valve for the combustion-chamber, and an extension at the upper part of the combustion-chamber, both combustion-chamber with extension and valve being submerged in the water, substantially as set forth.

13. A motor-fluid generator, consisting of a closed boiler, a combustion-chamber located in the lower part or water-space of the same, means for supplying a combustible gas and air mixture under pressure to said combustion-chamber, a valve having a spindle, for the combustion-chamber, a cylindrical extension provided with openings at the upper part of the combustion-chamber, and means attached to said extension for guiding the spindle of the valve, substantially as set forth.

14. A motor-fluid generator, consisting of a closed boiler, a combustion-chamber located in the lower part or water-space of the same, means for supplying a combustible gas and air mixture under pressure to said combustion-chamber, a dome-shaped valve having an upright spindle for the combustion-chamber, a cylindrical extension at the upper part of the combustion-chamber and provided with openings, and means for guiding the spindle of the dome-shaped valve, substantially as set forth.

15. A motor-fluid generator, consisting of a closed boiler, a combustion-chamber located in the lower part or water-space of the same, means for supplying a combustible gas and air mixture under pressure to said combustion-chamber, a valve for the combustion-chamber, a cylindrical extension at the upper part of the combustion-chamber provided with a plurality of circumferentially-arranged openings in proximity to the circumference of the valve, and means attached to the upper part of said extension for guiding the spindle of the valve, substantially as set forth.

16. A motor-fluid generator, consisting of a closed boiler, a combustion-chamber located in the lower part or water-space of the same and open at its upper end, means for supplying a combustible gas and air mixture under pressure to said combustion-chamber, an annular flange at the upper part of the combustion-chamber provided with a valve-seat, a valve for the open upper end of the combustion-chamber and resting on the valve-seat when closed, a cylindrical extension at the upper part of the combustion-chamber having a plurality of openings at its upper part, and means attached to the upper part of said extension for guiding the valve, substantially as set forth.

17. A motor-fluid generator, consisting of a closed boiler, a combustion-chamber located in the lower part or water-space of the same, a double-walled jacket extending around the lower part of the combustion-chamber for preheating the water supplied to the boiler, means for supplying a combustible gas and air mixture under pressure to the combustion-chamber, means for igniting said combustible gas and air mixture in the combustion-chamber, a valve for the combustion-chamber, and means for causing the circulation of the water in the water-space of the boiler, substantially as set forth.

18. A motor-fluid generator, consisting of a closed boiler, a combustion-chamber in the lower part or water-space of the same, a firebrick lining in said combustion-chamber, means for supplying a combustible gas and air mixture under pressure to said combustion-chamber, and a valve for opening or closing the upper end of the combustion-chamber by the varying internal pressure of the gases in the combustion-chamber, both said combustion-chamber and valve being submerged in the water, substantially as set forth.

19. A motor-fluid generator, consisting of a closed boiler, a combustion-chamber in the lower part or water-space of the same and provided with a fire-brick lining, a twyer in the lower part of the combustion-chamber provided with a plurality of air passages or channels, means for supplying a combustible gas and air mixture under pressure to said twyer and combustion-chamber, and a valve for opening or closing the upper part of the combustion-chamber by the varying internal pressure of the gases in the combustion-chamber, both said combustion-chamber and valve being submerged in the water, substantially as set forth.

20. A motor-fluid generator, consisting of a closed boiler, a combustion-chamber in said boiler and open at its upper end, means for supplying a combustible gas and air mixture to the bottom of said combustion-chamber, an electric ignition device in proximity to the entrance of the combustible gas and air mixture, and a valve for the open upper end of the combustion-chamber, substantially as set forth.

21. The combination, with a motor-fluid generator having a combustion-chamber located in the lower part or water-space of the same, an opening at its upper end, and a valve for the upper end, of means for mixing a combustible gas with air, means for compressing the same with water, means for heating the compressed mixture, means for separating the combustible gas and air from the water, means for supplying the water to the generator and gas and air mixture to the combustion-chamber, and means for igniting the combustible gas and air mixture in said combustion-chamber, substantially as set forth.

22. The combination, with a motor-fluid generator having a combustion-chamber located in the lower part or water-space of the same, an opening at its upper end, and a valve for the upper end, of means for mixing a combustible gas with air, means for subjecting the mixture with water to an isothermal compression, means for heating the compressed mixture, means for separating the combustible gas and air from the water, means for supplying the water to the generator and gas and air mixture to the combustion-chamber, and means for igniting the combustible gas and air mixture in said combustion-chamber, substantially as set forth.

In testimony that I claim the foregoing as my invention, I have signed my name in presence of two subscribing witnesses.

RUDOLF BERG.

Witnesses:
  S. J. TOOLE,
  P. F. TOOLE.